United States Patent
Li et al.

(10) Patent No.: US 11,375,519 B2
(45) Date of Patent: Jun. 28, 2022

(54) WIRELESS COMMUNICATION METHOD AND APPARATUS

(71) Applicant: HUAWEI TECHNOLOGIES CO., LTD., Guangdong (CN)

(72) Inventors: Xiaojie Li, Xi'an (CN); Fan Shi, Xi'an (CN); Fei Jiao, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 368 days.

(21) Appl. No.: 16/519,379

(22) Filed: Jul. 23, 2019

(65) Prior Publication Data

US 2019/0349955 A1    Nov. 14, 2019

Related U.S. Application Data

(63) Continuation of application No. PCT/CN2017/072264, filed on Jan. 23, 2017.

(51) Int. Cl.
*H04W 72/12*     (2009.01)
*H04W 76/28*     (2018.01)
(Continued)

(52) U.S. Cl.
CPC ......... *H04W 72/121* (2013.01); *H04L 5/0051* (2013.01); *H04W 72/0473* (2013.01); *H04W 76/28* (2018.02)

(58) Field of Classification Search
None
See application file for complete search history.

(56) References Cited

U.S. PATENT DOCUMENTS

2010/0322109 A1*   12/2010   Ahn ............... H04W 12/02
                                                           370/254

FOREIGN PATENT DOCUMENTS

CN    102104873 A    6/2011
CN    102421144 A    4/2012
(Continued)

OTHER PUBLICATIONS

Pantech, "Joint muting information in DL signaling for coherent JT CoMP," 3GPP TSG RAN1 #66bis, R1-113107, Zhuhai, China, Oct. 10-14, 2011, 3 pages.
(Continued)

*Primary Examiner* — Ayaz R Sheikh
*Assistant Examiner* — Sori A Aga
(74) *Attorney, Agent, or Firm* — Fish & Richardson P.C.

(57) ABSTRACT

The present disclosure relates to wireless communication methods and apparatus. One example method is executed in a communications system including N cells, where at least two cells of the N cells perform wireless communication by using a same carrier set, the carrier set includes M carriers, the M carriers are divided into N time-frequency resource groups, the M time-frequency resources in a same time-frequency resource group are in a one-to-one correspondence with the M carriers, and time domain locations of time-frequency resources corresponding to a same carrier are different, N≥2, and M≥2. The example method includes determining, by a network device, a first time-frequency resource group from the N time-frequency resource groups, and performing, by the network device, wireless communication in a first cell of the N cells by using one or more time-frequency resources in the first time-frequency resource group.

20 Claims, 5 Drawing Sheets

(51) Int. Cl.
    *H04L 5/00*      (2006.01)
    *H04W 72/04*   (2009.01)

(56) References Cited

FOREIGN PATENT DOCUMENTS

| CN | 103002453 A | 3/2013 |
|---|---|---|
| WO | 2009099289 A2 | 8/2009 |

OTHER PUBLICATIONS

Office Action issued in Japanese Application No. 2019-539848 dated Sep. 29, 2020, 5 pages (with English translation).
PCT International Search Report and Written Opinion issued in International Application No. PCT/CN2017/072,264, dated Oct. 12, 2017, 17 pages (With English Translation).

\* cited by examiner

WIRELESS COMMUNICATION METHOD AND APPARATUS

CROSS-REFERENCE TO RELATED APPLICATIONS

This application is a continuation of International Application No. PCT/CN2017/072264, filed on Jan. 23, 2017. The disclosure of which is hereby incorporated by reference in its entirety.

TECHNICAL FIELD

Embodiments of the present invention relate to the communications field, and more specifically, to a method and an apparatus related to wireless communication in the communications field.

BACKGROUND

With popularization of intelligent terminals, abundant services promote rapid development of mobile broadband, so that network traffic continuously increases. The increased network traffic exacerbates an interference problem in a communications system. In a Long Term Evolution (Long Term Evolution, LTE) system, inter-cell interference is one of important factors that affect an LTE system capacity and system performance. Especially, a user located on an edge of a cell has relatively poor user experience. At present, an intra-frequency networking manner is mainly used between cells in the system. For intra-frequency networking, co-channel interference coordination is implemented, for example, coordinated multipoint transmission/reception (Coordinated Multiple Points Transmission/Reception, COMP) and inter-cell interference coordination (Inter-Cell Interference Coordination, ICIC). This co-channel interference coordination method can reduce interference of a service channel between intra-frequency cells, but cannot reduce interference of a control channel between the intra-frequency cells. Therefore, for an intra-frequency cell, how to effectively reduce interference of both a service channel and a control channel has become an urgent problem that needs to be resolved in the industry.

SUMMARY

Embodiments of the present invention provide a wireless communication method and a network device, so as to effectively reduce interference between intra-frequency cells, and especially, reduce interference of a control channel between the intra-frequency cells.

According to a first aspect, a wireless communication method is provided, where the method is executed in a communications system including N cells, at least two cells of the N cells can perform wireless communication by using a same carrier set, the carrier set includes M carriers, the M carriers are divided into N time-frequency resource groups, each of the N time-frequency resource groups includes M time-frequency resources, the M time-frequency resources in a same time-frequency resource group are in a one-to-one correspondence with the M carriers, and in any two time-frequency resource groups, time domain locations of time-frequency resources corresponding to a same carrier are different, where N≥2, and M≥2; and the method includes: determining, by a network device, a first time-frequency resource group from the N time-frequency resource groups; and performing, by the network device, wireless communication in a first cell of the N cells by using some or all time-frequency resources in the first time-frequency resource group, where the first cell is provided by the network device.

Therefore, according to the wireless communication method provided in this embodiment of the present invention, the N time-frequency resource groups are obtained by dividing the M carriers, and in any two of the N time-frequency resource groups, the time domain locations of the time-frequency resources corresponding to the same carrier are different, so that interference between intra-frequency cells can be effectively reduced, that is, the network device can use different time-frequency resources to perform wireless communication in different cells. Because the time domain locations of the time-frequency resources corresponding to the same carrier are different, the interference between the intra-frequency cells can be effectively reduced. Compared with the prior art, interference of a control channel between the intra-frequency cells can be reduced more effectively.

With reference to the first aspect, in a first implementation of the first aspect, time domain locations of the M time-frequency resources in the same time-frequency resource group are different.

Therefore, according to the wireless communication method provided in this embodiment of the present invention, the time domain locations of the M time-frequency resources in the same time-frequency resource group are different, so that when the network device performs wireless communication in a same cell, interference between carriers can be effectively reduced, and power sharing between different carriers in the same cell can be effectively supported.

With reference to the first aspect, in a second implementation of the first aspect, the performing, by the network device, wireless communication in the first cell by using some or all time-frequency resources in the first time-frequency resource group includes: determining, by the network device, a first transmit power, where the first transmit power is a total transmit power that can be used by the first cell to perform wireless communication on the M carriers in a first period, the first period is a period corresponding to an $i^{th}$ time-frequency resource of the some or all time-frequency resources in the first time-frequency resource group, i□[1, P], and P≤M; determining, by the network device, a second transmit power according to the first transmit power, so that the second transmit power is less than or equal to the first transmit power; and performing, by the network device, wireless communication on the $i^{th}$ time-frequency resource by using the second transmit power.

Therefore, according to the wireless communication method provided in this embodiment of the present invention, a transmit power of a time-frequency resource used for performing wireless communication is dynamically allocated according to the first transmit power, thereby effectively implementing power sharing between different carriers in a same cell.

With reference to the first aspect, in a third implementation of the first aspect, the method further includes: determining, by the network device, a second time-frequency resource group from the N time-frequency resource groups, where the second time-frequency resource group is a time-frequency resource group used by the network device to perform wireless communication in a second cell of the N cells; and prohibiting by the network device from sending, in the first cell, a cell-specific reference signal CRS of the first cell on a time-frequency resource in the second time-frequency resource group.

Therefore, according to the wireless communication method provided in this embodiment of the present invention, the network device prohibits from sending, in the first cell, the CRS on the time-frequency resource in the second time-frequency resource group, so that interference to an inter-frequency neighboring cell can be effectively reduced.

With reference to the first aspect, in a fourth implementation of the first aspect, the method further includes: obtaining, by the network device, first data, where the first data is data to be transmitted in the second cell by using some or all time-frequency resources in the second time-frequency resource group; and transmitting, by the network device in the first cell, the first data by using the some or all time-frequency resources in the second time-frequency resource group.

Therefore, according to the wireless communication method provided in this embodiment of the present invention, in the first cell, the network device uses a time-frequency resource that is prohibited from being used to send the CRS of the first cell as a coordinating resource, to transmit data of an inter-frequency neighboring cell (that is, the second cell), so that a signal-to-noise ratio of a signal carrying the user data of the second cell can be effectively improved, and data transmission quality is improved.

With reference to the first aspect, in a fifth implementation of the first aspect, the method further includes: dividing, by the network device, the M carriers to determine the N time-frequency resource groups.

With reference to the first aspect, in a sixth implementation of the first aspect, the dividing, by the network device, the M carriers to determine the N time-frequency resource groups includes: dividing, by the network device, the M carriers according to a physical cell identifier PCI, to determine the N time-frequency resource groups.

According to a second aspect, a wireless communication method is provided, where the method is executed in a communications system including N cells, at least two cells of the N cells can perform wireless communication by using a same carrier set, the carrier set includes M carriers, the M carriers are divided into N time-frequency resource groups, each of the N time-frequency resource groups includes M time-frequency resources, the M time-frequency resources in a same time-frequency resource group are in a one-to-one correspondence with the M carriers, and in any two time-frequency resource groups, time domain locations of time-frequency resources corresponding to a same carrier are different, where N≥2, and M≥2; and the method includes:

receiving, by a terminal device, indication information sent by a network device, where the indication information is used to indicate a first time-frequency resource group in the N time-frequency resource groups, the terminal device is located in a first cell of the N cells, and the first cell is provided by the network device; and performing, by the terminal device, wireless communication in the first cell by using some or all time-frequency resources in the first time-frequency resource group.

Therefore, according to the wireless communication method provided in this embodiment of the present invention, the N time-frequency resource groups are obtained by dividing the M carriers, and in any two of the N time-frequency resource groups, the time domain locations of the time-frequency resources corresponding to the same carrier are different, so that interference between intra-frequency cells can be effectively reduced, that is, the terminal device can use different time-frequency resources to perform wireless communication with the network device in different cells. Because the time domain locations of the time-frequency resources corresponding to the same carrier are different, the interference between the intra-frequency cells can be effectively reduced. Compared with the prior art, interference of a control channel between the intra-frequency cells can be reduced more effectively.

With reference to the second aspect, in a first implementation of the second aspect, time domain locations of the M time-frequency resources in the same time-frequency resource group are different.

With reference to the second aspect, in a second implementation of the second aspect, the N time-frequency resource groups are obtained by dividing the M carriers by the network device.

With reference to the second aspect, in a third implementation of the second aspect, the N time-frequency resource groups are obtained by dividing the M carriers by the network device according to a physical cell identifier PCI.

According to a third aspect, a wireless communications apparatus is provided, and the apparatus may be configured to execute an operation of the network device according to the first aspect or any possible implementation of the first aspect. Specifically, the apparatus may include modules and units that are configured to execute an operation of the network device according to the first aspect or any possible implementation of the first aspect.

According to a fourth aspect, a wireless communications apparatus is provided, and the apparatus may be configured to execute an operation of the terminal device according to the second aspect or any possible implementation of the second aspect. Specifically, the apparatus may include modules and units that are configured to execute an operation of the network device according to the second aspect or any possible implementation of the second aspect.

According to a fifth aspect, a wireless communication network device is provided, and the network device includes a processor, a transceiver, and a memory. The processor, the transceiver, and the memory communicate with each other by using an inner connection path. The memory is configured to store an instruction, and the processor is configured to execute the instruction stored by the memory. When the processor executes the instruction stored by the memory, the network device executes the method according to the first aspect or any possible implementation of the first aspect, or the network device implements the apparatus provided in the third aspect.

According to a sixth aspect, a wireless communication terminal device is provided, and the terminal device includes a processor, a transceiver, and a memory. The processor, the transceiver, and the memory communicate with each other by using an inner connection path. The memory is configured to store an instruction, and the processor is configured to execute the instruction stored by the memory. When the processor executes the instruction stored by the memory, the terminal device executes the method according to the second aspect or any possible implementation of the second aspect, or the terminal device implements the apparatus provided in the fourth aspect.

According to a seventh aspect, a computer-readable storage medium is provided and is configured to store a computer program, where the computer program includes an instruction that is used to execute the method according to the first aspect or any possible implementation of the first aspect.

According to an eighth aspect, a computer-readable storage medium is provided and is configured to store a computer program, where the computer program includes an instruction that is used to execute the method according to the second aspect or any possible implementation of the second aspect.

With reference to the implementations of all the aspects, in some implementations, the N time-frequency resource groups are allocated to the N cells, so that each of the N cells uses a time-frequency resource group corresponding to the cell.

BRIEF DESCRIPTION OF DRAWINGS

To describe the technical solutions in the embodiments of the present invention more clearly, the following briefly describes the accompanying drawings required for describing the embodiments or the prior art.

DESCRIPTION OF EMBODIMENTS

The following clearly and completely describes the technical solutions in the embodiments of the present invention with reference to the accompanying drawings in the embodiments of the present invention.

It should be understood that the technical solutions of the embodiments of the present invention may be applied to various communications systems, such as a Global System for Mobile Communications (Global System of Mobile communication, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an advanced Long Term Evolution (Advanced long term evolution, LTE-A) system, a Universal Mobile Telecommunications System (Universal Mobile Telecommunication System, UMTS), or a next-generation communications system.

The embodiments of the present invention are described with reference to a network device. The network device may be a device configured to communicate with a mobile device. The network device may be an access point (ACCESS POINT, AP) in a WLAN or a base transceiver station (Base Transceiver Station, BTS) in GSM or CDMA; or may be a NodeB (NodeB, NB) in WCDMA; or may be an evolved NodeB (Evolutional Node B, eNB or eNodeB) in LTE, or a relay node or an access point, or an in-vehicle device, a wearable device, a network device in a future 5G network, a network device in a future evolved-PLMN network, or the like.

Optionally, the network device may be a base station. The base station may be an omnidirectional base station, or may be a directional base station. A coverage area of the omnidirectional base station includes one sector, a coverage area of the directional base station includes three sectors, and different sectors have different coverage areas.

Figure 1:
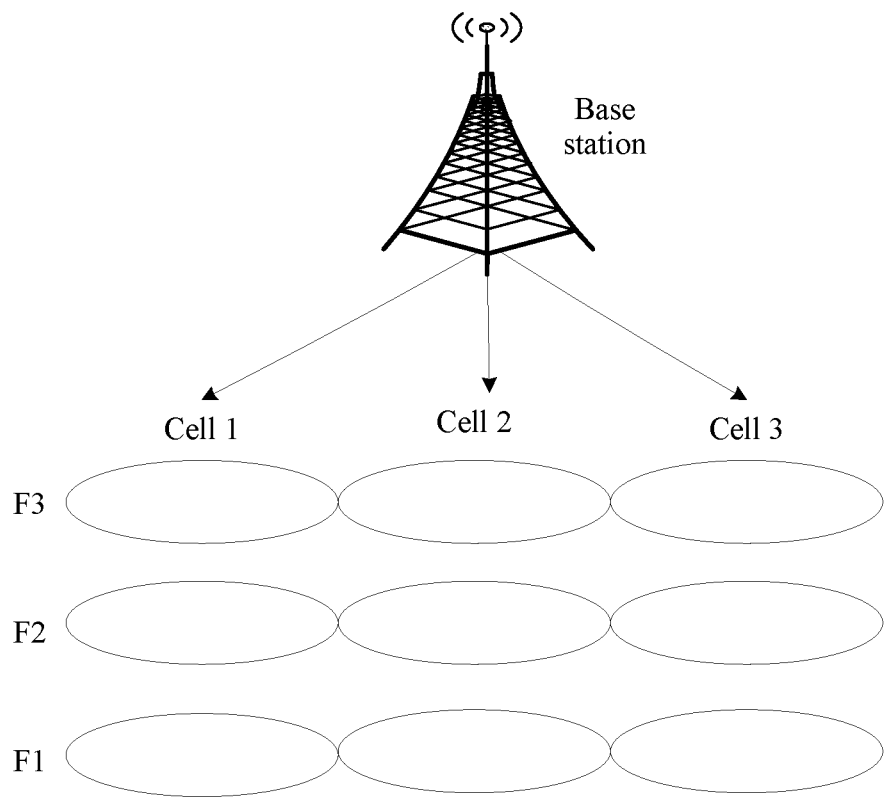
FIG. 1 is a schematic architecture diagram of a communications system that is applicable to a wireless communication method according to the present invention.

In a communications system, one base station may be corresponding to at least two cells, and the at least two cells may perform communication by using at least two carriers. As shown in FIG. 1, the directional base station is used as an example. One base station is corresponding to three cells, that is, a cell 1, a cell 2, and a cell 3. The three cells may perform wireless communication by using three carriers, that is, a carrier 1, a carrier 2, and a carrier 3. As an example instead of a limitation, one base station may be corresponding to more than three cells, and multiple cells may also perform communication by using more than three carriers. FIG. 1 is merely a schematic description and imposes no limitation on this embodiment of the present invention.

It should be understood that this embodiment of the present invention may be applied to different cells corresponding to a same base station, and may further be applied to different cells corresponding to different base stations. For example, the cell 1 and the cell 2 are neighboring cells, or the cell 1 and the cell 2 belong to different base stations.

In addition, the embodiments of the present invention are described with reference to a cell. The cell may be a cell corresponding to a network device (for example, a base station). The cell may belong to a macro base station, or belong to a base station corresponding to a small cell (small cell). The small cell herein may include a metro cell (Metro cell), a micro cell (Micro Cell), a pico cell (Pico Cell), a femto cell (Femto Cell), and the like. These small cells feature small coverage and a low transmit power, and are applicable to a high-rate data transmission service.

The embodiments of the present invention provide a wireless communication method and apparatus. The method may be executed by the network device, and the network device includes a hardware layer, an operating system layer running above the hardware layer, and an application layer running above the operating system layer. The hardware layer includes hardware such as a central processing unit (Central Processing Unit, CPU), a memory management unit (Memory Management Unit, MMU), a memory (also referred to as a main memory), and the like. The operating system may be any one of or more computer operating systems that implement service processing by using a process (process), such as a Linux operating system, a Unix operating system, an Android operating system, an iOS operating system, or a Windows operating system. The application layer includes applications such as a browser, an address book, word processing software, and instant communication software. In addition, a specific structure of an entity for executing the wireless communication method is not particularly limited in the embodiments of the present invention, provided that the entity can perform communication according to the wireless communication method in the embodiments of the present invention by running a program of code recording the wireless communication method in the embodiments of the present invention. For example, the wireless communication method in the embodiments of the present invention may be executed by a network device or a function module that is in a network device and that can invoke a program and execute the program.

In addition, aspects or features in the embodiments of the present invention may be implemented as a method, an apparatus or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (Compact Disc, CD), a digital versatile disc (Digital Versatile Disc, DVD)), a smart card and a flash memory component (for example, erasable programmable read-only memory (Erasable Programmable Read-Only Memory, EPROM), a card, a stick, or a key drive). In addition, various storage media described in this specification may indicate one or more devices and/or other machine-readable media that is used to store information. The term "machine-readable media" may include but is not limited to a radio channel, and various other media that can store, contain and/or carry an instruction and/or data.

Figure 2A:
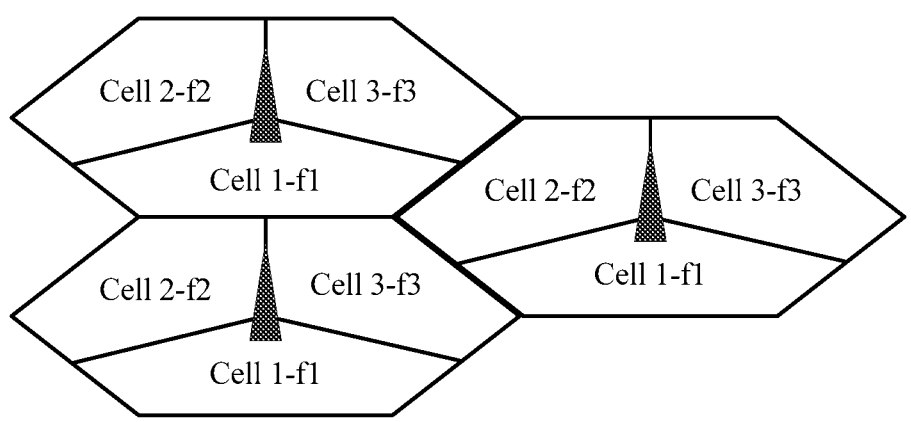
FIG. 2a to FIG. 2b are schematic diagrams of a method for reducing inter-cell interference in the prior art.

In the prior art, a technology for resolving inter-cell interference is inter-frequency networking. In inter-frequency networking, different frequencies are used in neighboring cells. In this way, a serving cell receives no co-channel interference from a neighboring cell. As shown in FIG. 2a, each hexagon represents an entire coverage area of a base station. The coverage area of the base station includes three sectors, each sector is corresponding to a cell, and a total frequency band of a system is divided into three parts, which are respectively denoted by f1, f2, and f3. Each cell uses any frequency band, and a neighboring cell uses a different frequency band. A base station 1 in FIG. 2a is used as an example. Three cells corresponding to the base station 1 are respectively a cell 1, a cell 2, and a cell 3. The cell 1 uses the frequency band f1, the cell 2 uses the frequency band f2, and the cell 3 uses the frequency band f3. Neighboring cells of the cell 1 corresponding to the base station 1 are a cell 2 and a cell 3 that are corresponding to a base station 2 and a cell 2 corresponding to a base station 3. The cell 2 corresponding to the base station 2 uses the frequency band f2, the cell 3 corresponding to the base station 2 uses the frequency band f3, and the cell 2 corresponding to the base station 3 uses the frequency band f2. A neighboring cell of the cell 3 corresponding to the base station 1 is the cell 2 corresponding to the base station 3, and the cell 2 corresponding to the base station 3 uses the frequency band f2. In this way, frequency bands used between neighboring cells are effectively staggered. Even if a cell in an outer ring uses a same frequency band, the serving cell may not be severely affected due to a long distance. According to the method, inter-cell interference can be effectively reduced, but a multi-carrier service cannot be supported.

For an intra-frequency networking manner, a technology for resolving inter-cell interference is an ICIC technology. In the existing ICIC technology, to reduce inter-cell interference, in a same carrier, a frequency band corresponding to a same carrier used by different cells is divided into an edge frequency band and a center frequency band. In addition, users in different cells are classified into edge users and center users. Different types of users use different frequency band allocation schemes.

Figure 2B:
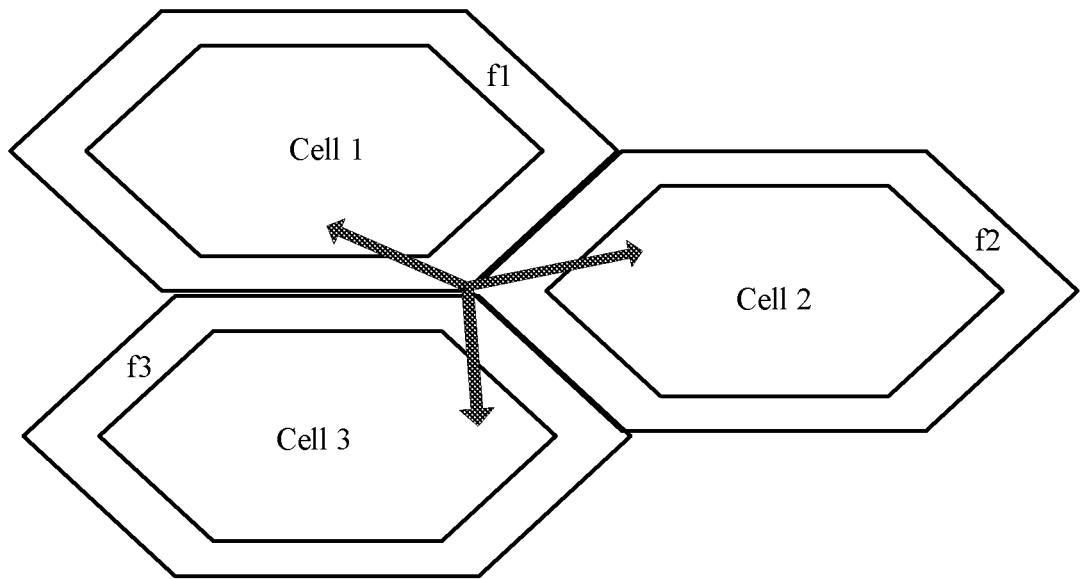

A frequency band allocation scheme is shown in FIG. 2b. Each hexagon represents a sector. A coverage area of a base station is corresponding to three sectors, each sector is corresponding to a cell, and the three cells use a same frequency band. A total frequency band of the cells is divided into three parts, which are respectively denoted by f1, f2, and f3. Edges of different cells are corresponding to different frequency bands. The frequency band f1 (that is, an edge frequency band) is allocated to an edge user in a cell 1, and the frequency bands f2 and f3 (that is, center frequency bands) are allocated to a center user in the cell 1. The frequency band f2 (that is, an edge frequency band) is allocated to an edge user in a cell 2, and the frequency bands f1 and f3 (that is, center frequency bands) are allocated to a center user in the cell 2. The frequency band f3 (that is, an edge frequency band) is allocated to an edge user in a cell 3; and the frequency bands f1 and f2 (that is, center frequency bands) are allocated to a center user in the cell 3. In this way, different frequency bands are allocated to the edge users in the three cells.

Because edge frequency bands of different cells have been staggered, for data transmission, a network device may appropriately allocate frequency domain resources to different pieces of data for transmission, so that different pieces of data are transmitted on different frequency domain resources. In this way, interference between different cells is reduced on a service channel. However, because of randomness of frequency domain resource transmission of control information, the network device cannot appropriately allocate different frequency domain resources to the control information, so that control information of different cells may use a same frequency domain resource simultaneously, interference of a control channel cannot be reduced, transmission quality on an edge of a cell is greatly reduced, and user experience on the edge of the cell is relatively poor.

To resolve the foregoing problems, an embodiment of the present invention provides a wireless communication method. The method in this embodiment of the present invention is executed in a communications system including N cells; at least two cells of the N cells can perform wireless communication by using a same carrier set; the carrier set includes M carriers; the M carriers are divided into N time-frequency resource groups; each of the N time-frequency resource groups includes M time-frequency resources; the M time-frequency resources in a same time-frequency resource group are in a one-to-one correspondence with the M carriers; and in any two time-frequency resource groups, time domain locations of time-frequency resources corresponding to a same carrier are different, where $N \geq 2$, and $M \geq 2$.

Figure 3:
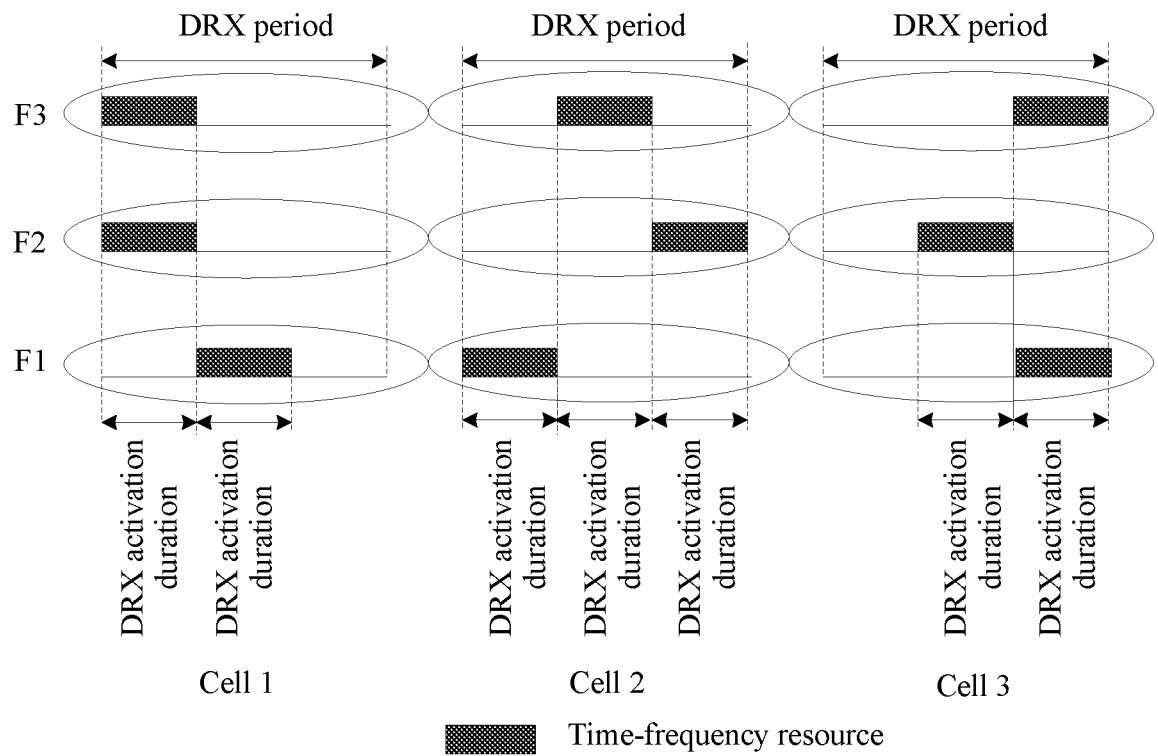
FIG. 3 is a schematic diagram of a time-frequency resource in a wireless communication method according to an embodiment of the present invention.

The N time-frequency resource groups may be allocated to the N cells, so that each of the N cells may use a time-frequency resource group corresponding to the cell. That is, one cell may use one time-frequency resource group, and different cells may use different time-frequency resource groups. Specifically, FIG. 3 is used as an example. N=3, and M=3, that is, the communications system includes three cells: a cell 1, a cell 2, and a cell 3, one sector is corresponding to one cell, and the carrier set includes three carriers: F1, F2, and F3. The three cells can use the three carriers to perform wireless communication. The three carriers are divided into three time-frequency resource groups. Each time-frequency resource group includes three time-frequency resources, and each time-frequency resource is corresponding to one carrier. Each cell is corresponding to one time-frequency resource group, that is, the cell 1 uses a time-frequency resource group 1 to perform wireless communication, the cell 2 uses a time-frequency resource group 2 to perform wireless communication, and the cell 3 uses a time-frequency resource group 3 to perform wireless communication. In addition, in any two time-frequency resource groups, time domain locations of time-frequency resources corresponding to a same carrier are different. For example, in the time-frequency resource group 1 and the time-frequency resource group 2, a time-frequency resource in the time-frequency resource group 1 and a time-frequency resource in the time-frequency resource group 2 that are corresponding to F1 are completely staggered in a time domain.

It should be understood that in this embodiment of the present invention, "the N time-frequency resource groups may be allocated to the N cells, so that each of the N cells may use a time-frequency resource group corresponding to the cell" is an expected implementation of the system. When performing wireless communication in a cell, the network device definitely performs wireless communication on a time-frequency resource group allocated to each cell, but a case of performing transmission in the cell on another time-frequency resource group is included.

For example, when there is a relatively large quantity of users or a relatively large service volume, and a time-frequency resource used for an actually transmitted service volume exceeds a time-frequency resource allocated to each cell, a cell may further use another time-frequency resource group to perform wireless communication when using a pre-allocated time-frequency resource group to perform wireless communication. In this case, different cells use a same time-frequency resource, and therefore, interference exists. However, as a whole, most service volumes of different cells have been concentrated on different time-frequency resources. Compared with the prior art, interference of a control channel between the intra-frequency cells can be effectively reduced.

Therefore, time domain locations of time-frequency resources that are in any two of the N time-frequency resource groups and that are corresponding to a same carrier are different. This can effectively reduce interference between intra-frequency cells, that is, a network device can use different time-frequency resources to perform wireless communication in different cells. Because the time domain locations of the time-frequency resources corresponding to the same carrier are different, the interference between the intra-frequency cells can be effectively reduced. Compared with the prior art, interference of a control channel between the intra-frequency cells can be reduced more effectively.

It should be understood that a value of N and a value of M are merely used as an example for description. This embodiment of the present invention is not limited thereto.

In addition, the N cells may be corresponding to a same network device, or may be corresponding to multiple network devices. This embodiment of the present invention is not limited thereto. For example, a first network device performs wireless communication in the cell 1, and a second network device performs wireless communication in the cell 2. The cell 1 and the cell 2 may be neighboring cells, or may not be neighboring cells.

It should be further understood that "the M carriers are divided into N time-frequency resource groups" may be understood as follows: based on the M carriers, a system time-frequency resource is divided into N time-frequency resource groups.

It should be noted that "in any two time-frequency resource groups, time domain locations of time-frequency resources corresponding to a same carrier are different" indicates that when the system time-frequency resource is divided into the N time-frequency resource groups, and when N is 2, time domain locations of time-frequency resources corresponding to a same carrier are definitely different; and when N≥3, time domain locations of all time-frequency resources corresponding to a same carrier are different. For example, as shown in FIG. 3, time domain locations of three time-frequency resources corresponding to F1 are different.

It should be specially noted that in this embodiment of the present invention, logically, one cell is corresponding to one sector, that is, FIG. 3 shows three cells and three sectors; and in some cases, logically, one cell is corresponding to one carrier, that is, FIG. 3 shows nine cells and three sectors. Therefore, the description of "one sector is corresponding to one cell" shown in FIG. 3 imposes no limitation on this embodiment of the present invention. When a coverage area of a network device includes three sectors, and one cell is corresponding to one carrier, the term "cell" in this embodiment of the present invention may be replaced with the term "sector".

Optionally, the network device divides the M carriers to determine the N time-frequency resource groups.

Specifically, when dividing the M carriers, the network device needs to determine start locations of discontinuous reception (Discontinuous Reception, DRX) activation durations of different cells corresponding to each carrier in the M carriers. The DRX activation duration may be understood as a corresponding time domain in which the network device can perform wireless communication, that is, the network device may perform wireless communication during DRX activation durations that are corresponding to different carriers and that may be used in different cells.

For a same carrier, in any two cells whose start locations of DRX activation durations are consecutive, a start location of a DRX activation duration of one cell is an end location of a DRX activation duration of the other cell. Therefore, a start location and an end location that are of a DRX activation duration of any cell are uniquely determined. Therefore, a time-frequency resource corresponding to each carrier in each cell may be determined according to the M carriers and start locations of discontinuous reception DRX activation durations corresponding to each carrier in the M carriers, so as to determine a time-frequency resource group corresponding to each cell.

For example, it is assumed that DRX periods of the three cells are all 160 ms, and the DRX period is divided into three periods. Time-frequency resources that are of different cells and corresponding to F1 in FIG. 3 are used as an example. A DRX activation duration of the cell 1 is 50 ms to 100 ms, a DRX activation duration of the cell 2 is 0 ms to 50 ms, and a DRX activation duration of the cell 3 is 100 ms to 160 ms. Therefore, a start location of the DRX activation duration of the cell 1 is 50, a start location of the DRX activation duration of the cell 2 is 0, and a start location of the DRX activation duration of the cell 3 is 100 ms. Because a start location of a DRX activation duration of one cell is an end location of a DRX activation duration of another cell, a DRX activation duration of each cell, that is, a time domain that can be used in wireless communication, can be uniquely determined.

As an example instead of a limitation, a start location of a DRX activation duration of a cell corresponding to each carrier may not be an end location of a DRX activation duration of another cell, that is, an interval exists, in a time domain, between DRX activation durations that are of different cells and corresponding to each carrier.

As an example instead of a limitation, an entity for dividing the M carriers is not limited to the network device.

For example, an administrator may divide the M carriers, and then enter information about the divided N time-frequency resource groups into the network device.

For another example, a core network device may divide the M carriers, and then determine the N time-frequency resource groups, so as to send information about the divided N time-frequency resource groups to the network device.

A specific division manner for the N time-frequency resource groups is described in detail in the following.

Optionally, that the network device divides the M carriers to determine the N time-frequency resource groups includes:

the network device divides the M carriers according to a physical cell identifier PCI, to determine the N time-frequency resource groups.

As an example instead of a limitation, the network device may divide the M carriers according to other information. The information is corresponding to the PCI, for example, the network device may divide the M carriers according to azimuth information of each cell, and a result obtained by performing a rounding operation on the azimuth is corresponding to a result obtained by performing a modulo-3 operation on the PCI.

It should be understood that when dividing the N time-frequency resource groups, the network device needs to determine start locations of DRX activation durations that are of different cells and corresponding to each carrier in the M carriers in a time domain, so as to determine the N time-frequency resource groups. Therefore, the determining the start locations of the DRX activation durations that are of different cells and corresponding to each carrier in the M carriers is described in detail in the following.

A start location of a DRX activation duration of each cell may be obtained, by means of calculation, by the network device according to the DRX period and cell-specific information (for example, a sector in which a cell is located, a carrier used by a cell, and a PCI of a cell). Similarly, for FIG. 3, a process of determining start locations of DRX activation durations that are of the three cells and corresponding to F1 is used as an example to describe this embodiment of the present invention.

A specific formula is A=(PCI mod 3)×10×max(floor(T/30), 1), where A represents a start location of an activation duration of a cell; PCI herein is used to represent a value corresponding to a physical cell identifier; PCI mod 3 represents a result obtained by performing a modulo-3 operation on the value corresponding to the PCI of the cell; T represents a DRX period of the cell; and floor (T/30) represents a rounding operation performed on a value in brackets. Table 1 lists calculation results obtained by performing a modulo operation on PCIs of the three cells.

TABLE 1

|  | Cell 1 | Cell 2 | Cell 3 |
|---|---|---|---|
| PCI | 16 | 15 | 17 |
| PCI mod 3 | 1 | 0 | 2 |
| A | 50 | 0 | 100 |

It can be learned from the foregoing that when another parameter is not changed, start locations of DRX activation durations that are of different cells and corresponding to each carrier and results obtained by performing a modulo operation on PCIs of cells are in a one-to-one correspondence. That is, for a same carrier, according to a result obtained by performing a modulo-3 operation on a PCI of each cell, a start location of a DRX activation duration of each cell may be uniquely determined. As an example instead of a limitation, a modulo operation may be performed on a value corresponding to a PCI of each cell by any integer greater than 1.

It should be understood that processes and manners of determining start locations of DRX activation durations that are of the three cells and corresponding to F2 and F3 are the same as the process and manner of determining the start locations of the DRX activation durations that are of the three cells and corresponding to F1. Herein, for avoiding repetition, detailed descriptions thereof are not given again.

Therefore, after start locations of DRX activation durations that are of the different cells and corresponding to each carrier are determined, time-frequency resources that are of the different cells and corresponding to each carrier are determined, so that time-frequency resources that are corresponding to all carriers and that can be used by one cell are determined as a time-frequency resource group, and N cells are corresponding to N time-frequency resource groups.

It should be noted that each time-frequency resource group may include a specified quantity of resource particles in a system time-frequency resource. The resource particle may be a smallest division unit of a time-frequency resource, for example, a resource particle may be corresponding to a resource element (Resource Element, RE).

It should be further noted that sizes of time-frequency resources (for example, including a quantity of REs) obtained after division may be the same, or may be different, and are determined according to a frequency band corresponding to each carrier.

In this embodiment of the present invention, a location that is on the system time-frequency resource and that is of each of the N time-frequency resource groups may be specified by a system or a communications protocol. In this case, the network device and a terminal device may directly determine a location of a required time-frequency resource group (that is, signaling does not need to be sent).

Alternatively, in this embodiment of the present invention, a location that is on the system time-frequency resource and that is of each of the N time-frequency resource groups may be determined by a network device and sent to a terminal device by using signaling.

Therefore, the terminal device may determine, in the foregoing manner, a location of a time-frequency resource for data that needs to be received or sent by the terminal device.

Therefore, when the network device performs wireless communication, the method 100 includes the following steps.

S110. The network device configured to provide a first cell of the N cells determines a first time-frequency resource group from the N time-frequency resource groups.

S120. The network device performs wireless communication in the first cell by using some or all time-frequency resources in the first time-frequency resource group.

It should be understood that in the following described embodiment, the "first" and the "second" are intended to merely distinguish different objects, for example, to distinguish different cells, and do not impose any limitation on the protection scope of this embodiment of the present invention.

Specifically, when performing wireless communication with the terminal device in a cell 1 (that is, an example of the first cell), the network device first determines a time-frequency resource group 1 (that is, an example of the first time-frequency resource group) that can be used to perform wireless communication, and then performs wireless communication on some or all time-frequency resources in the time-frequency resource group 1.

The some time-frequency resources may have three cases:

Case 1

The some time-frequency resources may be some time-frequency resources of each time-frequency resource in M time-frequency resources in the time-frequency resource group 1.

For example, the time-frequency resource group 1 includes four time-frequency resources. If it is assumed that a smallest resource particle included in each time-frequency resource of the four time-frequency resources is an RE, and quantities of REs included in all the time-frequency resources are the same and are 84, a quantity of REs of some time-frequency resources in each time-frequency resource is less than 84.

Case 2

The some time-frequency resources may be Q time-frequency resources in the time-frequency resource group 1, and Q<M.

For example, the time-frequency resource group 1 includes four time-frequency resources, and the some time-frequency resources are one, two, or three time-frequency resources in the four time-frequency resources.

Case 3

The some time-frequency resources may be some time-frequency resources of each time-frequency resource in Q time-frequency resources in the time-frequency resource group 1, and Q<M.

For example, the time-frequency resource group 1 includes four time-frequency resources. If it is assumed that a smallest resource particle included in each time-frequency resource of the four time-frequency resources is an RE, and quantities of REs included in all the time-frequency resources are the same and are 84, the some time-frequency resources may be one, two, or three time-frequency resources in the time-frequency resource group 1, and a quantity of REs in each time-frequency resource is less than 84.

A size of a time-frequency resource in each time-frequency resource group used by the network device to perform wireless communication may be determined according to a size of data or a reference signal or both that are transmitted between the network device and the terminal device, so as to perform appropriate resource scheduling.

Therefore, according to the wireless communication method provided in this embodiment of the present invention, the N time-frequency resource groups are obtained by dividing M carriers, and in the any two of the N time-frequency resource groups, the time domain locations of the time-frequency resources corresponding to the same carrier are different, so that the interference between intra-frequency cells can be effectively reduced, that is, the network device can use the different time-frequency resources to perform wireless communication in the different cells. Because the time domain locations of the time-frequency resources corresponding to the same carrier are different, the interference between the intra-frequency cells can be effectively reduced. Compared with the prior art, interference of a control channel between the intra-frequency cells can be reduced more effectively.

According to another aspect, because the network device may perform communication in a cell by using multiple carriers simultaneously, multi-carrier services such as carrier aggregation (Carrier Aggregation, CA) can be effectively supported.

As an example instead of a limitation, this embodiment of the present invention may be applied to not only a multi-carrier scenario but also a single carrier application scenario, provided that periods for data or reference signals or both that need to be transmitted by the terminal device can be staggered on a carrier.

Optionally, time domain locations of the M time-frequency resources in the same time-frequency resource group are different.

Figure 4:
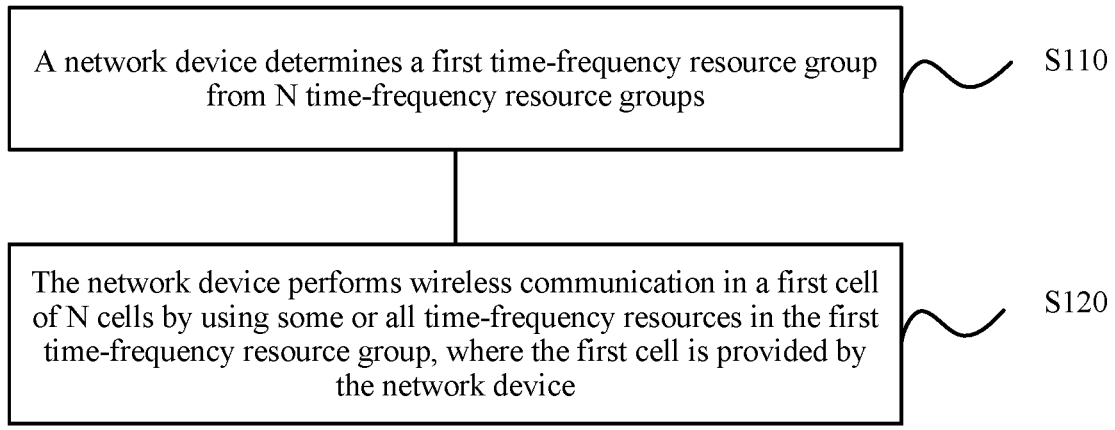
FIG. 4 is a schematic flowchart of a wireless communication method according to an embodiment of the present invention.

For how to stagger the time domain locations of the M time-frequency resources in the same time-frequency resource group, a specific formula is as follows: B=((PCI+Carrier Offset)mod 3)×10×(floor(T/30)), where B represents a start location of an activation duration of a cell; PCI may be used to represent a value corresponding to a physical cell identifier; Carrier Offset may be understood as a value corresponding to a carrier offset; (PCI+Carrier Offset)mod 3 represents a result obtained by performing a modulo-3 operation on a sum of values corresponding to the PCI of the cell and the Carrier Offset; T represents a DRX period of the cell; and floor (T/30) represents a rounding operation performed on a value in brackets. Three carriers and three cells are used as an example, and Table 2 lists calculation results obtained by performing a modulo operation on sums of values corresponding to PCIs of the three cells and values corresponding to carrier identifiers of the three carriers. FIG. 4 shows a schematic diagram of the foregoing calculation results.

TABLE 2

|  | Cell 1 | | Cell 2 | | Cell 3 | |
| --- | --- | --- | --- | --- | --- | --- |
|  | B | C | B | C | B | C |
| F1 | 100 | 2 | 0 | 0 | 50 | 1 |
| F2 | 50 | 1 | 100 | 2 | 0 | 0 |
| F3 | 0 | 0 | 50 | 1 | 100 | 2 |

C in Table 2 represents a result of (PCI+Carrier Offset) mod 3.

A difference between the formula used for drawing Table 1 and the formula used for drawing Table 2 lies in that a factor of the carrier offset is considered when a modulo operation is performed on a value, and an objective is to stagger time-frequency resources in a same cell in a time domain. It can be learned from the foregoing that when another parameter is not changed, start locations of DRX activation durations that are corresponding to different carriers and used in different cells are in a one-to-one correspondence with results obtained by performing a modulo operation on sums of values of carrier offsets and values of PCIs of the cells. That is, a start location of a DRX activation duration of each cell may be uniquely determined according to a result obtained by performing a modulo-3 operation on a sum of a value of a PCI of each cell and a value of a carrier offset. In addition, time-frequency resources of a same cell are effectively staggered in a time domain. As an example instead of a limitation, a modulo operation may be performed on a value corresponding to a PCI of each cell by any integer greater than 1.

Therefore, according to the wireless communication method provided in this embodiment of the present invention, the time domain locations of the M time-frequency resources in the same time-frequency resource group are different, so that when the network device performs wireless communication in a same cell, interference between carriers can be effectively reduced, and power sharing between different carriers in the same cell can be effectively supported.

Optionally, that the network device performs wireless communication in the cell by using some or all time-frequency resources in the first time-frequency resource group includes:

the network device determines a first transmit power, where the first transmit power is a total transmit power that can be used by the first cell to perform wireless communication on the M carriers in a first period, the first period is a period corresponding to an $i^{th}$ time-frequency resource of the some or all time-frequency resources in the first time-frequency resource group, i□[1, P], and P≤M;

the network device determines a second transmit power according to the first transmit power, so that the second transmit power is less than or equal to the first transmit power; and the network device performs wireless communication on the $i^{th}$ time-frequency resource by using the second transmit power.

The $i^{th}$ time-frequency resource indicates any time-frequency resource in some or all time-frequency resources in the time-frequency resource group 1. i□[1, P] indicates that the some or all time-frequency resources in the time-frequency resource group 1 are traversed. "The $i^{th}$ time-frequency resource+i□[1, P]" indicates the some or all time-frequency resources in the time-frequency resource group 1.

When P=M, it indicates that a cell 1 performs wireless communication in a period 1 (that is, an example of the first period) by using all the carriers (that is, the M carriers). When P<M, it indicates that the cell 1 performs wireless communication in the period 1 by using some carriers.

For the cell 1, because time domain locations of time-frequency resources in the time-frequency resource group 1 are different, so that when the network device performs wireless communication, transmit powers required for different carriers in a same period are different, so as to dynamically implement power sharing between different carriers in the same period. The "power sharing between different carriers" indicates that powers used by different carriers may be dynamically adjusted according to a requirement.

A specific implementation process of implementing power sharing between different carriers in a same period is described in detail in the following.

It should be noted that as mentioned in the foregoing, due to a factor of a relatively large quantity of users or a relatively large service volume, a time-frequency resource used for an actually transmitted service volume exceeds a time-frequency resource pre-allocated by the network device to each cell. When performing wireless communication by using the time-frequency resource in the time-frequency resource group 1, the network device may further perform wireless communication on another time-frequency resource.

Figure 5:
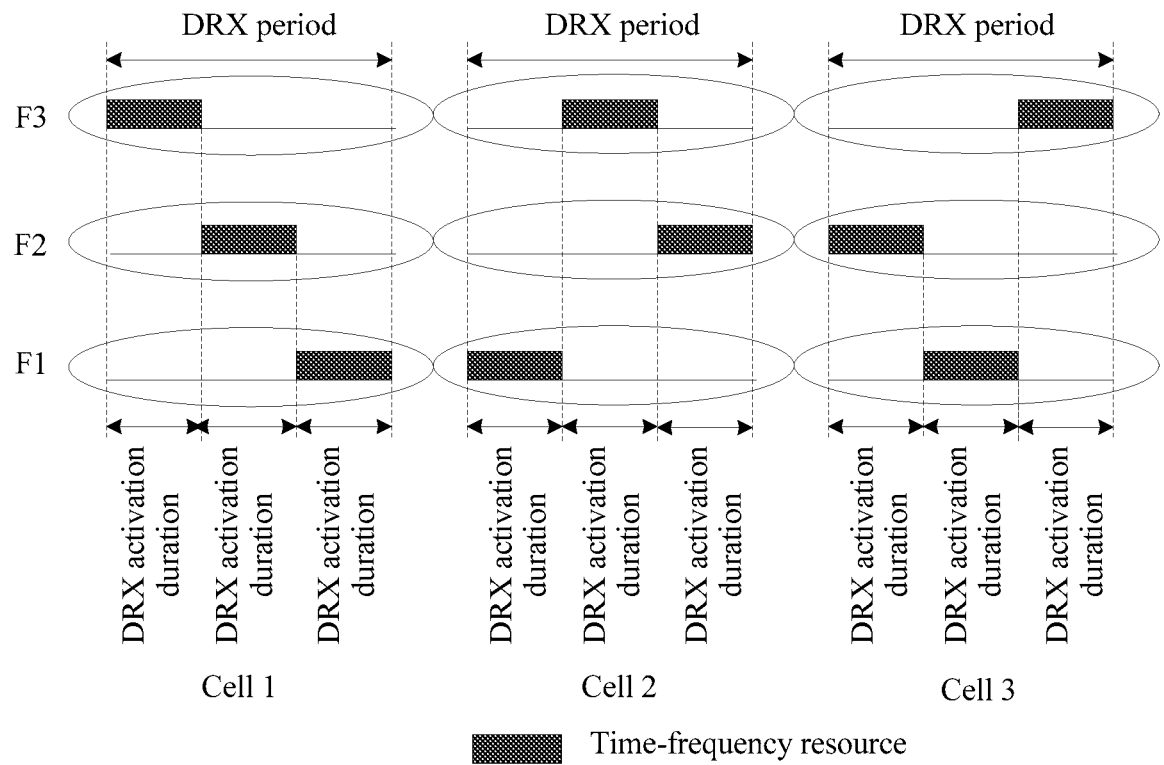
FIG. 5 is a schematic diagram of a wireless communication method according to another embodiment of the present invention.

For example, in the schematic diagram of a time-frequency resource shown in FIG. 5, it is assumed that a DRX period is 160 ms. In a cell 1, a time-frequency resource group 1 includes three time-frequency resources. A time-frequency resource corresponding to F3 is used as an example, and a time domain of the time-frequency resource corresponding to F3 is a DRX activation duration corresponding to F3 and is denoted as a period 1. A time-frequency resource including the period 1 and F3 belongs to the time-frequency resource group 1. A time-frequency resource including the period 1 and F2 and a time-frequency resource including the period 1 and F1 are the foregoing other time-frequency resources and do not belong to the time-frequency resource group 1.

The first transmit power may be understood as a rated transmit power configured by the network device for the first period, and the second transmit power may be understood as an actual transmit power that is required for transmission by the network device on the $i^{th}$ time-frequency resource, that is, a target transmit power.

Specifically, a rated transmit power 1 (that is, an example of the rated transmit power) is a fixed value, and may be directly configured by the system for the cell 1 in the period 1 (that is, an example of the first period). The network device monitors a load status of the cell 1 in the period 1 in real time. For powers of the cell 1 on different carriers in the period 1, the network device dynamically allocates powers to different carriers in the period 1 according to history transmission load, that is, according to a transmission load status in a period that is corresponding to the period 1 and that is in a last DRX period. A power of an $i^{th}$ time-frequency resource that belongs to the time-frequency resource group 1 is a target transmit power 1 (that is, an example of the target transmit power). Therefore, the network device performs wireless communication according to the powers of the different carriers in the period 1.

Because the $i^{th}$ time-frequency resource in the time-frequency resource group 1 is pre-configured by the network device, when the network device performs communication, the $i^{th}$ time-frequency resource definitely transmits most or all data and/or reference signals. Compared with the $i^{th}$ time-frequency resource, little data or few reference signals or both are transmitted on another time-frequency resource. Therefore, when the rated power 1 is allocated for use, a power requirement of the $i^{th}$ time-frequency resource is first met, provided that the target transmit power 1 is less than or equal to the rated transmit power 1.

For example, a transmission process of the cell 1 in a period of 100 ms to 160 ms in FIG. 5 is used an example. 100 ms to 160 ms in the last DRX period is a period (for ease of understanding and memorization, the period is denoted as a period 2) corresponding to the period 1, and 100 ms to 160 ms in a current DRX period is the period 1. The rated power 1 fixedly allocated by the network device to all carriers during 100 ms to 160 ms in all DRX periods in the cell 1 is qW; in the period 2, a power corresponding to transmit load of the network device on F1 is aW (actually, a power allocated to F1 is greater than or equal to aW); a power corresponding to transmit load on F2 is bW (actually, a power allocated to F2 is greater than or equal to bW); and a power corresponding to transmit load on F3 is cW (actually, a power allocated to F3 is greater than or equal to cW), and q≥a+b+c. A time-frequency resource corresponding to F1 belongs to the time-frequency resource group 1, that is, the time-frequency resource corresponding to F1 transmits most or all data and/or reference signals, a>b, and a>c. Therefore, according to the rated power 1 and the history transmission load, in the period 1 of the current DRX period, a power allocated by the network device to F1 is aW (that is, the target transmit power 1), a power allocated to F2 is bW, and a power allocated to F3 is cW. In this way, the network device dynamically allocates powers to different carriers in the period 1 according to the rated power 1 and the history transmission load, thereby implementing power sharing between different carriers in a same cell.

Therefore, according to the wireless communication method provided in this embodiment of the present invention, a transmit power of a time-frequency resource used for performing wireless communication is dynamically allocated according to the first transmit power, thereby effectively implementing power sharing between different carriers in a same cell.

As an example instead of a limitation, a specific implementation process of implementing power sharing between different carriers in a same period is merely used as an example for description. Any method for dynamically adjusting powers of different carriers in a same period falls within the protection scope of the embodiments of the present invention.

Optionally, the method further includes:

determining, by the network device, a second time-frequency resource group from the N time-frequency resource groups, where the second time-frequency resource group is a time-frequency resource group used by the network device to perform wireless communication in a second cell of the N cells; and prohibiting by the network device from sending, in the first cell, a cell-specific reference signal CRS of the first cell on some or all time-frequency resources in the second time-frequency resource group.

Specifically, as described in the foregoing, in the cell 1, when performing wireless communication by using a time-frequency resource in the time-frequency resource group 1, the network device may further perform wireless communication on another time-frequency resource. Herein, a time-frequency resource group 2 (that is, an example of the second time-frequency resource group) in other time-frequency resource groups is used as an example, that is, in the cell 1, the network device may perform wireless communication by using the time-frequency resource group 1 and the time-frequency resource group 2. Because the time-frequency resource group 2 is a time-frequency resource group that can be used for wireless communication and that is configured by the network device for a cell 2 (that is, an example of the second cell), the cell 2 definitely uses the time-frequency resource group 2 to perform wireless communication.

In this case, when the cell 1 and the cell 2 are neighboring cells, because the time-frequency resource group 2 is used by the cell 1 and the cell 2 at the same time, interference is generated between the cell 1 and the cell 2. Therefore, when little or no data is transmitted in the cell 1 by using the time-frequency resource group 2, it is prohibited to send a CRS of the cell 1 on a time-frequency resource in the time-frequency resource group 2. In this case, interference from the CRS of the cell 1 to the neighboring cell (that is, the cell 2) can be effectively reduced.

As an example instead of a limitation, in the cell 1, it may be prohibited to send a CRS of the cell 1 on the time-frequency resource in the time-frequency resource group 2, and when all terminal devices in the cell 1 are in a non-connected state during a period corresponding to any time-frequency resource other than the period 1 in the time-frequency resource group 2, it may be prohibited to send all public signals in the cell 1. In this way, interference to the cell 2 can be effectively reduced, and power consumption of the system can be effectively reduced.

In addition, for the cell 1, the time-frequency resource group 2 is merely a time-frequency resource group in the other time-frequency resource groups, multiple time-frequency resource groups other than the time-frequency resource group 1 may further be included. This embodiment of the present invention is not limited thereto.

Therefore, according to the wireless communication method provided in this embodiment of the present invention, the network device prohibit from sending, in the cell 1, a CRS on the time-frequency resource in the time-frequency resource group 2, so that interference to an inter-frequency neighboring cell can be effectively reduced.

In this embodiment of the present invention, to improve a probability of prohibiting sending, in a cell, of a CRS on a time-frequency resource other than a time-frequency resource in a time-frequency resource group corresponding to the cell, when transmission load in the cell is less than a first threshold, the network device may concentrate data and/or a reference signal in the cell in a limited quantity of periods for transmission, that is, the foregoing case 2 and case 3. To better perform wireless communication on some time-frequency resources described in the foregoing in case 2 and case 3, in this embodiment of the present invention, the method may be implemented by using a modified multi-carrier camping policy (for ease of understanding and memorization, it is denoted as a differentiated multi-carrier camping policy).

In addition, because a DRX activation duration is an expected value, in an actual method implementation process, a time in which a cell camps on a carrier may be greater than a time corresponding to the DRX activation duration, and interference is caused to communication of another cell on the same carrier. For example, the cell 1 and the cell 2 are used as an example. If a DRX activation duration of the cell 1 on F1 is 0 ms to 50 ms, and a DRX activation duration of the cell 2 on F2 is 50 ms to 100 ms, in an actual method implementation, a communication time of the cell 1 on F1 is 0 ms to 60 ms, and a communication time of the cell 2 on F1 is 50 ms to 100 ms. In this case, there is interference between the cell 1 and the cell 2 during 50 ms to 60 ms on F1.

Therefore, to improve a probability of prohibiting sending, in a cell, of a CRS on a time-frequency resource other than a time-frequency resource in a time-frequency resource group corresponding to the cell, and to reduce interference between two cells as much as possible, when the multi-carrier camping policy is being modified, camped carriers of different cells should be different carriers. Results are listed in Table 3, Table 4, and Table 5.

Similarly, that one network device is corresponding to three cells, and each cell may use three carriers to perform communication is used as an example to describe a manner of modifying the differentiated multi-carrier camping policy.

Table 3, Table 4, and Table 5 respectively show differentiated multi-carrier camping policies obtained by using three modification manners. Table 3 is corresponding to a modification manner 1, Table 4 is corresponding to a modification manner 2, and Table 5 is corresponding to a modification manner 5.

TABLE 3

|  | Cell 1 | Cell 2 | Cell 3 |
|---|---|---|---|
| F1 | High-priority camping | Low-priority camping | Low-priority camping |
| F2 | Low-priority camping | High-priority camping | Low-priority camping |
| F3 | Low-priority camping | Low-priority camping | High-priority camping |

TABLE 4

|  | Cell 1 | Cell 2 | Cell 3 |
|---|---|---|---|
| F1 | Low-priority camping | Low-priority camping | High-priority camping |
| F2 | High-priority camping | Low-priority camping | Low-priority camping |
| F3 | Low-priority camping | High-priority camping | Low-priority camping |

TABLE 5

|  | Cell 1 | Cell 2 | Cell 3 |
|---|---|---|---|
| F1 | Low-priority camping | High-priority camping | Low-priority camping |
| F2 | Low-priority camping | Low-priority camping | High-priority camping |
| F3 | High-priority camping | Low-priority camping | Low-priority camping |

The "High-priority camping" in Table 3, Table 4, and Table 5 indicates that when performing communication in different cells, the network device preferably selects a carrier corresponding to the high-priority camping to perform communication.

In a specific method implementation, the network device first needs to identify a multi-layer carrier in a same cell, and then determine, according to total load in the cell, whether to enable the differentiated multi-carrier camping policy. When the total load in the cell is less than a first threshold, the differentiated multi-carrier camping policy is enabled; when the differentiated multi-carrier camping policy becomes effective, the network device notifies, by using related information, the terminal device to select a preferably camped carrier to perform communication with the network device; or when the total load in the cell is greater than a first threshold, a system exits the multi-carrier camping policy.

The first threshold may be a value preset by the system, or may be a dynamically changing value determined by the network device according to history load. This embodiment of the present invention is not limited thereto.

It should be understood that when the network device enables the differentiated multi-carrier camping policy, a DRX activation duration of a cell on different carriers does not change, for example, the cell 1 in Table 3 is in a high-priority camping on F1, and a camping time is still a time corresponding to the DRX activation duration.

Therefore, the multi-carrier camping policy is modified, so that when the network device performs wireless communication, system flexibility is effectively improved.

When the network device prohibits from sending, in the cell 1, a CRS of the cell 1 on the time-frequency resource in the time-frequency resource group 2, optionally, the network device obtains first data, and the first data is data to be transmitted in the second cell by using some or all time-frequency resources in the second time-frequency resource group.

The network device sends, in the first cell, the first data by using the some or all time-frequency resources in the second time-frequency resource group.

In the prior art, joint transmission between cells requires CRS location alignment between the cells that jointly transmit data and/or a reference signal, and a maximum quantity of symbols of a physical downlink control channel (Physical Downlink Control Channel, PDCCH) are occupied. In this embodiment of the present invention, CRS locations in different cells cannot be aligned (most or all CRSs of the cell 1 are carried in the time-frequency resource group 1, and most or all CRSs of the cell 2 are carried in the time-frequency resource group 2). Therefore, joint transmission cannot be performed in different cells.

Specifically, for the cell 1, after it is prohibited to send a CRS on the time-frequency resource in the time-frequency resource group 2, an RE (for ease of understanding and memorization, it is denoted as a time-frequency resource 2-1) that is in the time-frequency resource group 2 and that is used to carry a CRS does not carry any data and/or signal any more. Therefore, in the cell 1, data 1 (that is, an example of the first data) is transmitted by using the time-frequency resource 2-1, and the data 1 is data to be transmitted by the network device in the cell 2 by using the some or all time-frequency resources in the time-frequency resource group 2. That is, the network device helps the cell 2 to transmit, in the cell 1 by using the time-frequency resource 2-1, the data that needs to be transmitted in the cell 2.

For the cell 2, the some or all time-frequency resources in the time-frequency resource group 2 are the time-frequency resource 2-1. Therefore, time-frequency resources used to transmit the data 1 in the cell 1 and time-frequency resources used to transmit the data 1 in the cell 2 should be the same, and a same data block is transmitted on a same RE.

Therefore, according to the wireless communication method provided in this embodiment of the present invention, in the cell 1, the network device uses a time-frequency resource that is prohibited from being used to send the CRS of the cell 1 as a coordinating resource, to transmit data of an inter-frequency neighboring cell (that is, the cell 2), so that a signal-to-noise ratio of a signal carrying the data of the inter-frequency neighboring cell can be effectively improved, and data transmission quality is improved.

In addition, when the cell 1 has a carrier aggregation (Carrier Aggregation, CA) service in the period 1, the network device does not prohibit from sending a CRS of the cell 1 on the time-frequency resource 2-1, that is, switches from a state of prohibiting sending of a CRS to a state of allowing sending of a CRS, so that transmission of the CA service is performed in the period 1. When the CA service ends, it is prohibited to send a CRS of the cell 1 again on the time-frequency resource 2-1. As described above, a start location of a DRX activation duration of each cell may be obtained, by means of calculation, by the network device by using cell-specific information of a DRX period. Therefore, to perform normal communication between the network device and the terminal device, optionally, the method further includes:

sending, by the network device, indication information to the terminal device located in the first cell, where the indication information is used to indicate the first time-frequency resource group.

Figure 6:
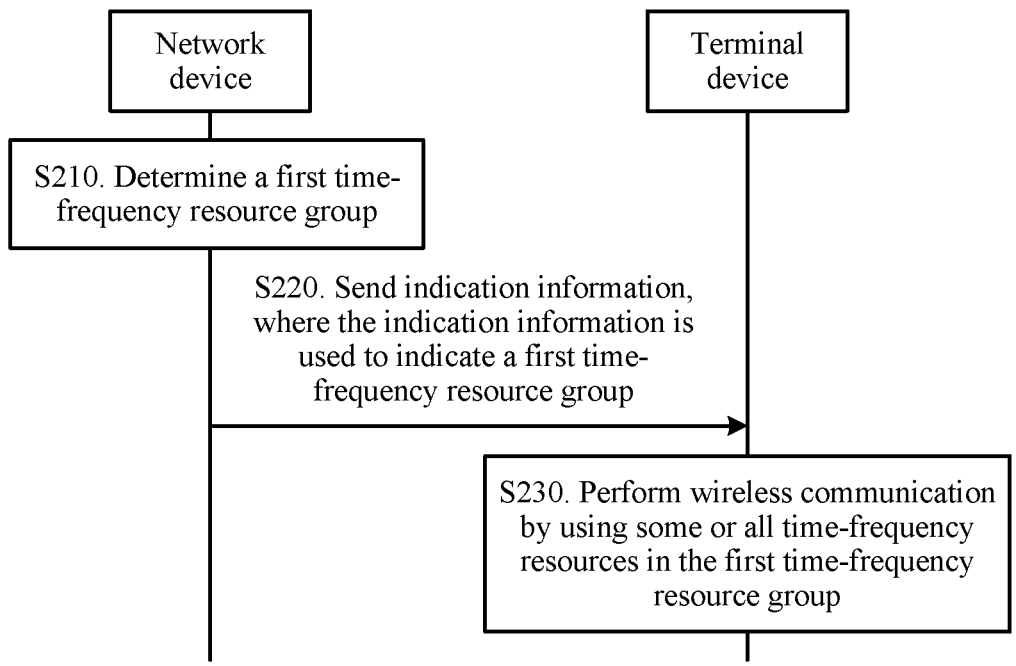
FIG. 6 is another schematic diagram of a time-frequency resource in a wireless communication method according to an embodiment of the present invention.

Specifically, as shown in FIG. 6, in step S210, the network device determines the first time-frequency resource group, and a specific process and a method are the same as those in the foregoing description. Details are not described herein again.

In S220, the network device sends the indication information to the terminal device (for ease of understanding and description, it is denoted as a terminal device #A) located in the first cell. The indication information is used to indicate the first time-frequency resource group, that is, is used to notify the terminal device #A to perform wireless communication with the network device on the first time-frequency resource group.

Further, the terminal device #A receives the indication information, determines the first time-frequency resource group, and then in S230, performs wireless communication by using the some or all time-frequency resources in the first time-frequency resource group.

As an example instead of a limitation, the indication information may be added to radio resource control (Radio Resource Control, RRC) signaling, or may be sent to the terminal device by using a broadcast channel. This embodiment of the present invention is not limited thereto.

Therefore, according to the wireless communication method provided in this embodiment of the present invention, interference between inter-frequency cells can be reduced, data transmission quality is improved, and the CA service can be dynamically activated effectively.

According to the wireless communication method provided in this embodiment of the present invention, in one aspect, the N time-frequency resource groups are obtained by dividing the M carriers, and in any two of the N time-frequency resource groups, the time domain locations of the time-frequency resources corresponding to the same carrier are different, so that the interference between intra-frequency cells can be effectively reduced, that is, the network device can use the different time-frequency resources to perform wireless communication in the different cells. Because the time domain locations of the time-frequency resources corresponding to the same carrier are different, the interference between the intra-frequency cells can be effectively reduced. Compared with the prior art, interference of a control channel between the intra-frequency cells can be reduced more effectively.

In another aspect, the time domain locations of the M time-frequency resources in the same time-frequency resource group are different, so that when the network device performs wireless communication in a same cell, interference between carriers can be effectively reduced, and power sharing between different carriers in the same cell can be effectively supported.

In another aspect, a transmit power of a time-frequency resource used for performing wireless communication is dynamically allocated according to a first transmit power, so that power sharing between different carriers in a same cell can be effectively implemented.

In another aspect, the network device prohibits from sending, in a first cell, a CRS on a time-frequency resource other than a first time-frequency resource, so that interference to an inter-frequency neighboring cell can be effectively reduced.

In still another aspect, in the first cell, the network device uses the time-frequency resource that is prohibited from being used to send the CRS of the first cell as a coordinating resource, to transmit data of the inter-frequency neighboring cell (that is, the second cell), so that the signal-to-noise ratio of a signal carrying the data of the inter-frequency neighboring cell can be effectively improved, and data transmission quality is improved.

The wireless communication method according to the embodiments of the present invention is described above with reference to FIG. 1 to FIG. 6, and a wireless communications apparatus according to the embodiments of the present invention is described in the following with reference to FIG. 7 to FIG. 10. Technical features described in the method embodiment are also applicable to embodiments of the following apparatus.

Figure 7:
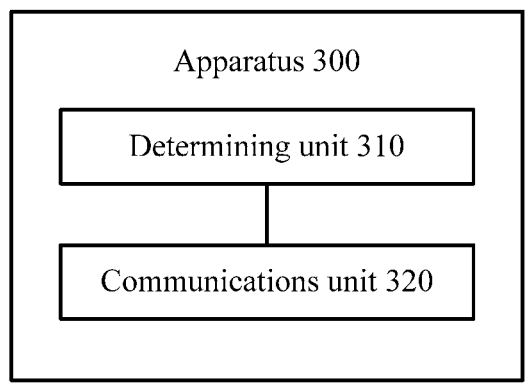
FIG. 7 is a schematic block diagram of a wireless communications apparatus according to an embodiment of the present invention.

FIG. 7 describes a wireless communications apparatus 300 according to the embodiments of the present invention. The apparatus 300 is executed in a communications system including N cells, at least two cells of the N cells can perform wireless communication by using a same carrier set, the carrier set includes M carriers, the M carriers are divided into N time-frequency resource groups, each of the N time-frequency resource groups includes M time-frequency resources, the M time-frequency resources in a same time-frequency resource group are in a one-to-one correspondence with the M carriers, and in any two time-frequency resource groups, time domain locations of time-frequency resources corresponding to a same carrier are different, where N≥2, and M≥2; and the apparatus 300 includes:

a determining unit 310, configured to determine a first time-frequency resource group from the N time-frequency resource groups; and a communications unit 320, configured to perform wireless communication in a first cell of the N cells by using some or all time-frequency resources in the first time-frequency resource group determined by the determining unit 310, where the first cell is provided by the apparatus.

The N time-frequency resource groups are allocated to the N cells, so that each of the N cells may use a time-frequency resource group corresponding to the cell. That is, one cell may use one time-frequency resource group, and different cells may use different time-frequency resource groups.

Therefore, according to the wireless communications apparatus provided in this embodiment of the present invention, the N time-frequency resource groups are obtained by dividing the M carriers, and in the any two of the N time-frequency resource groups, the time domain locations of the time-frequency resources corresponding to the same carrier are different, so that interference between intra-frequency cells can be effectively reduced, that is, a network device can use different time-frequency resources to perform wireless communication in different cells. Because the time domain locations of the time-frequency resources corresponding to the same carrier are different, the interference between the intra-frequency cells can be effectively reduced. Compared with the prior art, interference of a control channel between the intra-frequency cells can be reduced more effectively.

Optionally, time domain locations of the M time-frequency resources in the same time-frequency resource group are different.

Therefore, according to the wireless communications apparatus provided in this embodiment of the present invention, the time domain locations of the M time-frequency resources in the same time-frequency resource group are different, so that when the network device performs wireless communication in a same cell, interference between carriers can be effectively reduced, and power sharing between different carriers in the same cell can be effectively supported.

Optionally, the determining unit 310 is further configured to:

determine a first transmit power, where the first transmit power is a total transmit power that can be used by the first cell to perform wireless communication on the M carriers in a first period, the first period is a period corresponding to an $i^{th}$ time-frequency resource of the some or all time-frequency resources in the first time-frequency resource group, i∈[1, P], and P≤M.

The network device determines a second transmit power according to the first transmit power, so that the second transmit power is less than or equal to the first transmit power; and the communications unit 320 is specifically configured to:
perform wireless communication on the $i^{th}$ time-frequency resource by using the second transmit power.

Therefore, according to the wireless communications apparatus provided in this embodiment of the present invention, a transmit power of a time-frequency resource used for performing wireless communication is dynamically allocated according to the first transmit power, thereby effectively implementing power sharing between different carriers in a same cell.

Optionally, the determining unit 310 is further configured to:
determine a second time-frequency resource group from the N time-frequency resource groups, where the second time-frequency resource group is a time-frequency resource group used by the network device to perform wireless communication in a second cell of the N cells; and the communications unit 320 is further configured to:
prohibit from sending, in the first cell, a cell-specific reference signal CRS of the first cell on a time-frequency resource in the second time-frequency resource group.

Therefore, according to the wireless communications apparatus provided in this embodiment of the present invention, the network device prohibits from sending, in the first cell, the CRS on the time-frequency resource in the second time-frequency resource group, so that interference to an inter-frequency neighboring cell can be effectively reduced.

Optionally, the apparatus 300 further includes:
an obtaining unit 330, configured to obtain first data, where the first data is data to be transmitted in the second cell by using some or all time-frequency resources in the second time-frequency resource group; and the communications unit 320 is further configured to:
transmit, in the first cell, the first data by using the some or all time-frequency resources in the second time-frequency resource group.

Therefore, according to the wireless communications apparatus provided in this embodiment of the present invention, in the first cell, the network device uses a time-frequency resource that is prohibited from being used to send the CRS of the first cell as a coordinating resource, to transmit data of an inter-frequency neighboring cell (that is, the second cell), so that a signal-to-noise ratio of a signal carrying the user data of the second cell can be effectively improved, and data transmission quality is improved.

Optionally, the apparatus 300 further includes:
a division unit 340, configured to divide the M carriers to determine the N time-frequency resource groups.

Optionally, the division unit 340 is specifically configured to:
divide the M carriers according to a physical cell identifier PCI, to determine the N time-frequency resource groups.

The wireless communications apparatus 300 according to this embodiment of the present invention may be corresponding to a network device in the method in the embodiments of the present invention. In addition, units and modules in the wireless communications apparatus 300 and the foregoing other operations and/or functions are respectively intended to implement corresponding procedures that are executed by the network device and that is of the method 100. For brevity, details are not described herein.

According to the wireless communications apparatus provided in this embodiment of the present invention, in one aspect, the N time-frequency resource groups are obtained by dividing the M carriers, and in the any two of the N time-frequency resource groups, the time domain locations of the time-frequency resources corresponding to the same carrier are different, so that the interference between intra-frequency cells can be effectively reduced, that is, the network device can use the different time-frequency resources to perform wireless communication in the different cells. Because the time domain locations of the time-frequency resources corresponding to the same carrier are different, the interference between the intra-frequency cells can be effectively reduced. Compared with the prior art, interference of a control channel between the intra-frequency cells can be reduced more effectively.

In another aspect, the time domain locations of the M time-frequency resources in the same time-frequency resource group are different, so that when the network device performs wireless communication in a same cell, interference between carriers can be effectively reduced, and power sharing between different carriers in the same cell can be effectively supported.

In another aspect, the transmit power of the time-frequency resource used for performing wireless communication is dynamically allocated according to a first rated transmit power, so that power sharing between different carriers in a same cell can be effectively implemented.

In another aspect, the network device prohibits from sending, in the first cell, a CRS on a time-frequency resource other than a first time-frequency resource, so that interference to an inter-frequency neighboring cell can be effectively reduced.

In still another aspect, in the first cell, the network device uses the time-frequency resource that is prohibited from being used to send the CRS of the first cell as the coordinating resource, to transmit the data of the inter-frequency neighboring cell (that is, the second cell), so that the signal-to-noise ratio of the signal carrying the data of the inter-frequency neighboring cell can be effectively improved, and data transmission quality is improved.

Figure 8:
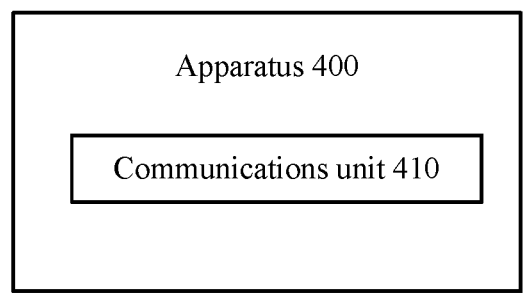
FIG. 8 is a schematic block diagram of a wireless communications apparatus according to an embodiment of the present invention.

FIG. 8 shows a wireless communications apparatus 400 according to an embodiment of the present invention. The apparatus 400 is executed in a communications system including N cells, at least two cells of the N cells can perform wireless communication by using a same carrier set, the carrier set includes M carriers, the M carriers are divided into N time-frequency resource groups, each of the N time-frequency resource groups includes M time-frequency resources, the M time-frequency resources in a same time-frequency resource group are in a one-to-one correspondence with the M carriers, and in any two time-frequency resource groups, time domain locations of time-frequency resources corresponding to a same carrier are different, where N≥2, and M≥2; and the apparatus 400 includes:

a communications unit 410, configured to receive indication information sent by a network device, where the indication information is used to indicate a first time-frequency resource group in the N time-frequency resource groups, the apparatus is located in a first cell of the N cells, and the first cell is provided by the network device; and the communications unit 410 is further configured to perform wireless communication in the first cell by using some or all time-frequency resources in the first time-frequency resource group.

Optionally, time domain locations of the M time-frequency resources in the same time-frequency resource group are different.

Optionally, the N time-frequency resource groups are obtained by dividing the M carriers by the network device.

Optionally, the N time-frequency resource groups are obtained by dividing the M carriers by the network device according to a physical cell identifier PCI.

The wireless communications apparatus 400 according to this embodiment of the present invention may be corresponding to a terminal device in the method according to the embodiments of the present invention. In addition, units and modules in the wireless communications apparatus 400 and the foregoing other operations and/or functions are respectively intended to implement corresponding procedures that are executed by the terminal device and that is of the method 200. For brevity, details are not described herein.

Therefore, according to the wireless communications apparatus provided in this embodiment of the present invention, the N time-frequency resource groups are obtained by dividing the M carriers, and in the any two of the N time-frequency resource groups, the time domain locations of the time-frequency resources corresponding to the same carrier are different, so that interference between intra-frequency cells can be effectively reduced, that is, the terminal device can use different time-frequency resources to perform wireless communication with the network device in different cells. Because the time domain locations of the time-frequency resources corresponding to the same carrier are different, the interference between the intra-frequency cells can be effectively reduced. Compared with the prior art, interference of a control channel between the intra-frequency cells can be reduced more effectively.

Figure 9:
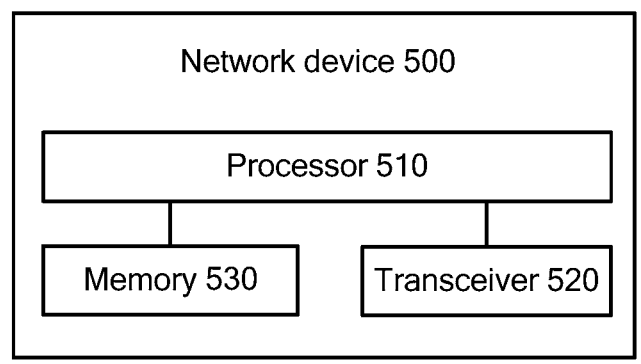
FIG. 9 is a schematic structural diagram of a wireless communication network device according to an embodiment of the present invention.

FIG. 9 shows a network device 500 for wireless communication according to an embodiment of the present invention. The network device 500 is executed in a communications system including N cells, at least two cells of the N cells can perform wireless communication by using a same carrier set, the carrier set includes M carriers, the M carriers are divided into N time-frequency resource groups, each of the N time-frequency resource groups includes M time-frequency resources, the M time-frequency resources in a same time-frequency resource group are in a one-to-one correspondence with the M carriers, and in any two time-frequency resource groups, time domain locations of time-frequency resources corresponding to a same carrier are different, where N≥2, and M≥2. The network device 500 includes a processor 510, a transceiver 520, and a memory 530. The processor 510, the transceiver 520, and the memory 530 communicate with each other by using an inner connection path.

The memory 530 is configured to store a program. Specifically, the program may include program code, and the program code includes a computer operation instruction. The memory 530 may include a read-only memory and a random access memory, and provide an instruction and data for the processor 510. The memory 530 may include a high-speed RAM memory, and may further include a non-volatile memory (non-volatile memory), for example, at least one disk memory.

The processor 510 executes a program stored in the memory 530, to control the transceiver 520 to receive or send a signal. The memory 530 may be integrated into the processor 510, or may be independent of the processor 510.

Specifically, the processor 510 is configured to determine a first time-frequency resource group from the N time-frequency resource groups.

The transceiver 520 is configured to perform wireless communication in a first cell of the N cells by using some or all time-frequency resources in the first time-frequency resource group. The first cell is provided by the network device.

The N time-frequency resource groups are allocated to the N cells, so that each of the N cells uses a time-frequency resource group corresponding to the cell. That is, one cell uses one time-frequency resource group, and different cells use different time-frequency resource groups.

Therefore, according to the wireless communication network device in this embodiment of the present invention, the N time-frequency resource groups are obtained by dividing the M carriers, and in the any two of the N time-frequency resource groups, the time domain locations of the time-frequency resources corresponding to the same carrier are different, so that interference between intra-frequency cells can be effectively reduced, that is, the network device can use the different time-frequency resources to perform wireless communication in different cells. Because the time domain locations of the time-frequency resources corresponding to the same carrier are different, the interference between the intra-frequency cells can be effectively reduced. Compared with the prior art, interference of a control channel between the intra-frequency cells can be reduced more effectively.

Optionally, time domain locations of the M time-frequency resources in the same time-frequency resource group are different.

Therefore, according to the wireless communication network device provided in this embodiment of the present invention, the time domain locations of the M time-frequency resources in the same time-frequency resource group are different, so that when the network device performs wireless communication in a same cell, the interference between carriers can be effectively reduced, and power sharing between different carriers in the same cell can be effectively supported.

Optionally, the processor 510 is further configured to:

determine a first transmit power, where the first transmit power is a total transmit power that can be used by the first cell to perform wireless communication on the M carriers in a first period, the first period is a period corresponding to an $i^{th}$ time-frequency resource of the some or all time-frequency resources in the first time-frequency resource group, $i \in [1, P]$, and $P \leq M$; and determine a second transmit power according to the first transmit power, so that the second transmit power is less than or equal to the first transmit power; and the transceiver 520 is specifically configured to:

perform wireless communication on the $i^{th}$ time-frequency resource by using the first transmit power.

Therefore, according to the wireless communication network device provided in this embodiment of the present invention, a transmit power of a time-frequency resource used for performing wireless communication is dynamically allocated according to the first transmit power, thereby effectively implementing power sharing between different carriers in a same cell.

Optionally, the processor 510 is further configured to:

determine a second time-frequency resource group from the N time-frequency resource groups, where the second time-frequency resource group is a time-frequency resource group used by the network device to perform wireless communication in a second cell of the N cells; and prohibit from sending, in the first cell, a cell-specific reference signal CRS of the first cell on a time-frequency resource in the second time-frequency resource group.

Therefore, the wireless communication network device provided in this embodiment of the present invention prohibits from sending, in the first cell, the CRS on the time-frequency resource in the second time-frequency resource group, so that interference to an inter-frequency neighboring cell can be reduced more effectively.

Optionally, the processor 510 is further configured to:

obtain first data, where the first data is data to be transmitted in the second cell by using some or all time-frequency resources in the second time-frequency resource group; and the transceiver 520 is further configured to:

transmit, in the first cell, the first data by using the some or all time-frequency resources in the second time-frequency resource group.

Therefore, in the first cell, the wireless communication network device provided in this embodiment of the present invention uses a time-frequency resource that is prohibited from being used to send the CRS of the first cell as a coordinating resource, to transmit data of an inter-frequency neighboring cell (that is, the second cell), so that a signal-to-noise ratio of a signal carrying the user data of the second cell can be effectively improved, and data transmission quality is improved.

Optionally, the processor 510 is further configured to:

divide the M carriers to determine the N time-frequency resource groups.

Optionally, the processor 510 is specifically configured to:

divide the M carriers according to a physical cell identifier PCI, to determine the N time-frequency resource groups.

This embodiment of the present invention may be applied to a processor, or implemented by a processor. The processor may be an integrated circuit chip and has a signal processing capability. In an implementation process, the steps in the foregoing methods may be completed by means of an integrated logic circuit of hardware in the processor 510 or an instruction in a form of software. The foregoing processor 510 may be a general-purpose processor, including a central processing unit (Central Processing Unit, CPU), a network processor (Network Processor, NP), and the like, or may be a digital signal processor (DSP), an application-specific integrated circuit (ASIC), a field programmable gate array (FPGA), another programmable logical device, a discrete gate or transistor logic device, or a discrete hardware component. The processor 510 may implement or perform methods, steps, and logical block diagrams disclosed in the embodiments of the present invention. The general-purpose processor may be a microprocessor or this processor may be any normal processor, or the like. The steps of the method disclosed with reference to the embodiments of the present invention may be directly performed and completed by a hardware decoding processor, or performed and completed by a combination of hardware and software modules in a decoding processor. The software module may be located in a mature storage medium in the field, such as a random access memory, a flash memory, a read-only memory, a programmable read-only memory, an electrically-erasable programmable read-only memory, or a register. The storage medium is located in the memory 530. The processor 510 reads information from the memory 530, and completes the steps of the foregoing method in combination with hardware of the processor 510. To avoid repetition, details are not described herein again.

It may be understood that a memory in this embodiment of the present invention may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) used as a high-speed external cache. According to description that is used as an example instead of a limitation, RAMs of many forms are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that a purpose of the memory in the system and the method that are described in this specification is to include but is not limited to these and a memory of any other proper type.

The network device 500 for wireless communication according to this embodiment of the present invention may be corresponding to the network device in the method according to the embodiments of the present invention. In addition, units and modules in the network device 500 for wireless communication and the foregoing other operations and/or functions are respectively intended to implement corresponding procedures that are executed by the network device and that is of the method 100. For brevity, details are not described herein.

Therefore, according to the wireless communication network device provided in this embodiment of the present invention, the N time-frequency resource groups are obtained by dividing the M carriers, and in the any two of the N time-frequency resource groups, the time domain locations of the time-frequency resources corresponding to the same carrier are different, so that the interference between the intra-frequency cells can be effectively reduced, that is, when the network device uses the different time-frequency resource groups to perform wireless communication in different cells, because the time domain locations of the time-frequency resources corresponding to the same carrier are different, the interference between the intra-frequency cells can be effectively reduced. Compared with the prior art, interference of a control channel between the intra-frequency cells can be reduced more effectively.

In another aspect, the time domain locations of the M time-frequency resources in the same time-frequency resource group are different, so that when the network device performs wireless communication in a same cell, interference between carriers can be effectively reduced, and power sharing between different carriers in the same cell can be effectively supported.

In another aspect, a transmit power of a time-frequency resource used for performing wireless communication is dynamically allocated according to the first transmit power, so that power sharing between different carriers in a same cell can be effectively implemented.

In another aspect, the network device prohibits from sending, in the first cell, a CRS on a time-frequency resource other than a first time-frequency resource, so that interference to an inter-frequency neighboring cell can be effectively reduced.

In still another aspect, in the first cell, the network device uses a time-frequency resource that is prohibited from being used to send the CRS of the first cell as a coordinating resource, to transmit data of an inter-frequency neighboring cell (that is, the second cell), so that a signal-to-noise ratio of a signal carrying the data of the inter-frequency neighboring cell can be effectively improved, and data transmission quality is improved.

Figure 10:
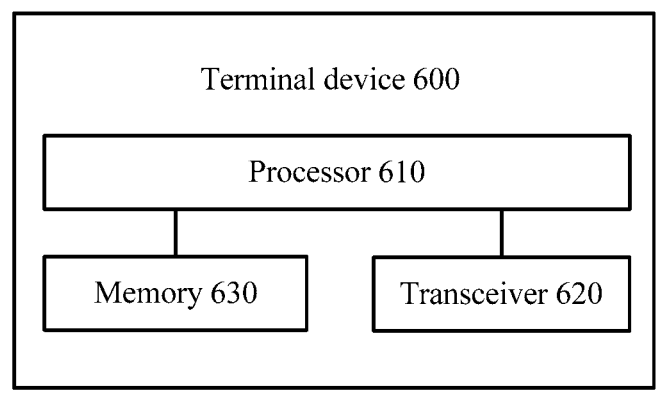
FIG. 10 is a schematic structural diagram of a wireless communication terminal device according to an embodiment of the present invention.

FIG. 10 shows a terminal device 600 for wireless communication according to an embodiment of the present invention. The terminal device 600 is executed in a communications system including N cells, at least two cells of the N cells can perform wireless communication by using a same carrier set, the carrier set includes M carriers, the M carriers are divided into N time-frequency resource groups, each of the N time-frequency resource groups includes M time-frequency resources, the M time-frequency resources in a same time-frequency resource group are in a one-to-one correspondence with the M carriers, and in any two time-frequency resource groups, time domain locations of time-frequency resources corresponding to a same carrier are different, where N≥2, and M≥2; and the terminal device 600 includes a processor 610, a transceiver 620, and a memory 630, where the processor 610, the transceiver 620, and the memory 630 communicate with each other by using an inner connection path.

The memory 630 is configured to store a program. Specifically, the program may include program code, and the program code includes a computer operation instruction. The memory 630 may include a read-only memory and a random access memory, and provide an instruction and data for the processor 610. The memory 630 may include a high-speed RAM memory, and may further include a non-volatile memory (non-volatile memory), for example, at least one disk memory.

The processor 610 executes a program stored in the memory 630, to control the transceiver 620 to receive or send a signal. The memory 630 may be integrated into the processor 610, or may be independent of the processor 610.

Specifically, the transceiver 620 is configured to receive indication information sent by a network device, where the indication information is used to indicate a first time-frequency resource group in the N time-frequency resource groups, the terminal device is located in a first cell of the N cells, and the first cell is provided by the network device; and the transceiver 620 is further configured to perform wireless communication in the first cell by using some or all time-frequency resources in the first time-frequency resource group.

Optionally, time domain locations of the M time-frequency resources in the same time-frequency resource group are different.

Optionally, the N time-frequency resource groups are obtained by dividing the M carriers by the network device.

Optionally, the N time-frequency resource groups are obtained by dividing the M carriers by the network device according to a physical cell identifier PCI.

This embodiment of the present invention may be applied to a processor, or implemented by a processor. The processor may be an integrated circuit chip and has a signal processing capability. In an implementation process, the steps in the foregoing methods may be completed by means of an integrated logic circuit of hardware in the processor 610 or an instruction in a form of software. The foregoing processor 610 may be a general-purpose processor, including a central processing unit (Central Processing Unit, CPU for short), a network processor (Network Processor, NP for short), and the like, or may be a digital signal processor (DSP), an application-specific integrated circuit (ASIC), a field programmable gate array (FPGA), another programmable logical device, a discrete gate or transistor logic device, or a discrete hardware component. The processor 610 may implement or perform methods, steps, and logical block diagrams disclosed in the embodiments of the present invention. The general-purpose processor may be a microprocessor or this processor may be any normal processor, or the like. The steps of the method disclosed with reference to the embodiments of the present invention may be directly performed and completed by a hardware decoding processor, or performed and completed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 630. The processor 610 reads information from the memory 630, and completes the steps of the foregoing method in combination with hardware of the processor. To avoid repetition, details are not described herein repeatedly.

It may be understood that a memory in this embodiment of the present invention may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) used as a high-speed external cache. According to description that is used as an example instead of a limitation, RAMs of many forms are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that a purpose of the memory in the system and the method that are described in this specification is to include but is not limited to these and a memory of any other proper type.

The terminal device 600 for wireless communication according to this embodiment of the present invention may be corresponding to the network device in the method according to the embodiments of the present invention. In addition, units and modules in the terminal device 600 for wireless communication and the foregoing other operations and/or functions are respectively intended to implement corresponding procedures that are executed by the network device and that is of the method 200. For brevity, details are not described herein.

Therefore, according to the wireless communication terminal device provided in this embodiment of the present invention, in any two of the N time-frequency resource groups, time domain locations of time-frequency resources corresponding to a same carrier are different, so that interference between intra-frequency cells can be reduced, that is, a terminal device can use different time-frequency resources to perform wireless communication with a network device in different cells. Because the time domain locations of the time-frequency resources corresponding to the same carrier are different, the interference between the intra-frequency cells can be effectively reduced. Compared with the prior art, interference of a control channel between the intra-frequency cells can be reduced more effectively.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the embodiments of the present invention shall be subject to the protection scope of the claims.

What is claimed is:

1. A wireless communication method, wherein the method is executed in a communications system comprising N cells, wherein at least two cells of the N cells are capable of performing wireless communication by using a same carrier set, wherein the carrier set comprises M carriers, wherein the M carriers are divided into N time-frequency resource groups, wherein each time-frequency resource group of the N time-frequency resource groups comprises M time-frequency resources, wherein the M time-frequency resources in a same time-frequency resource group are in a one-to-one correspondence with the M carriers, wherein in any two time-frequency resource groups, time domain locations of time-frequency resources corresponding to a same carrier are different, wherein N≥2 and M≥2, and wherein the method comprises:

determining, by a network device, a first time-frequency resource group from the N time-frequency resource groups; and performing, by the network device, wireless communication in a first cell of the N cells by using one or more time-frequency resources in the first time-frequency resource group, wherein the first cell is provided by the network device.

2. The method according to claim 1, wherein time domain locations of the M time-frequency resources in the same time-frequency resource group are different.

3. The method according to claim 2, wherein the performing, by the network device, wireless communication in the first cell by using one or more time-frequency resources in the first time-frequency resource group comprises:

determining, by the network device, a first transmit power, wherein the first transmit power is a total transmit power used by the first cell to perform wireless communication on the M carriers in a first period, wherein the first period is a period corresponding to an $i^{th}$ time-frequency resource of the one or more time-frequency resources in the first time-frequency resource group, wherein $i \in [1,P]$, and wherein $P \leq M$;

determining, by the network device, a second transmit power according to the first transmit power, wherein the second transmit power is less than or equal to the first transmit power; and performing, by the network device, wireless communication on the $i^{th}$ time-frequency resource by using the second transmit power.

4. The method according to claim 1, wherein the method further comprises:

determining, by the network device, a second time-frequency resource group from the N time-frequency resource groups, wherein the second time-frequency resource group is a time-frequency resource group used by the network device to perform wireless communication in a second cell of the N cells; and prohibiting, by the network device, from sending, in the first cell, a cell-specific reference signal (CRS) of the first cell on a time-frequency resource in the second time-frequency resource group.

5. The method according to claim 4, wherein the method further comprises:

obtaining, by the network device, first data, wherein the first data is data to be transmitted in the second cell by using one or more time-frequency resources in the second time-frequency resource group; and transmitting, by the network device and in the first cell, the first data by using the one or more time-frequency resources in the second time-frequency resource group.

6. The method according to claim 1, wherein the method further comprises:

dividing, by the network device, the M carriers to determine the N time-frequency resource groups.

7. The method according to claim 6, wherein the dividing, by the network device, the M carriers to determine the N time-frequency resource groups comprises:

dividing, by the network device, the M carriers according to a physical cell identifier (PCI) to determine the N time-frequency resource groups.

8. The method according to claim 1, wherein the method further comprises:

sending, by the network device, indication information to a terminal device located in the first cell, wherein the indication information is used to indicate the first time-frequency resource group.

9. A wireless communication method, wherein the method is executed in a communications system comprising N cells, wherein at least two cells of the N cells perform wireless communication by using a same carrier set, the carrier set comprises M carriers, wherein the M carriers are divided into N time-frequency resource groups, wherein each time-frequency resource group of the N time-frequency resource groups comprises M time-frequency resources, wherein the M time-frequency resources in a same time-frequency resource group are in a one-to-one correspondence with the M carriers, wherein in any two time-frequency resource groups, time domain locations of time-frequency resources corresponding to a same carrier are different, wherein N≥2 and M≥2, and wherein the method comprises:

receiving, by a terminal device, indication information sent by a network device, wherein the indication information is used to indicate a first time-frequency resource group in the N time-frequency resource groups, wherein the terminal device is located in a first cell of the N cells, and wherein the first cell is provided by the network device; and performing, by the terminal device, wireless communication in the first cell by using one or more time-frequency resources in the first time-frequency resource group.

10. The method according to claim 9, wherein time domain locations of the M time-frequency resources in the same time-frequency resource group are different.

11. The method according to claim 9, wherein the N time-frequency resource groups are obtained by dividing the M carriers by the network device.

12. The method according to claim 11, wherein the N time-frequency resource groups are obtained by dividing the M carriers by the network device according to a physical cell identifier (PCI).

13. A wireless communications apparatus, wherein the apparatus is operated in a communications system comprising N cells, wherein at least two cells of the N cells perform wireless communication by using a same carrier set, wherein the carrier set comprises M carriers, wherein the M carriers are divided into N time-frequency resource groups, wherein each time-frequency resource group of the N time-frequency resource groups comprises M time-frequency resources, wherein the M time-frequency resources in a same time-frequency resource group are in a one-to-one correspondence with the M carriers, wherein in any two time-frequency resource groups, time domain locations of time-frequency resources corresponding to a same carrier are different, wherein N≥2 and M≥2, and wherein the apparatus comprises at least one processor and a memory coupled to the at least one processor and storing programming instructions for execution by the at least one processor to:

determine a first time-frequency resource group from the N time-frequency resource groups; and perform wireless communication in a first cell of the N cells by using one or more time-frequency resources in the first time-frequency resource group, wherein the first cell is provided by a network device.

14. The apparatus according to claim 13, wherein time domain locations of the M time-frequency resources in the same time-frequency resource group are different.

15. The apparatus according to claim 14, wherein the programming instructions are for execution by the at least one processor to:

determine a first transmit power, wherein the first transmit power is a total transmit power used by the first cell to perform wireless communication on the M carriers in a first period, wherein the first period is a period corresponding to an $i^{th}$ time-frequency resource of the one or more time-frequency resources in the first time-frequency resource group, wherein i∈[1, P], and wherein P≤M; and determine a second transmit power according to the first transmit power, wherein the second transmit power is less than or equal to the first transmit power; and perform wireless communication on the $i^{th}$ time-frequency resource by using the second transmit power.

16. The apparatus according to claim 13, wherein the programming instructions are for execution by the at least one processor to:

determine a second time-frequency resource group from the N time-frequency resource groups, wherein the second time-frequency resource group is a time-frequency resource group used by a network device to perform wireless communication in a second cell of the N cells; and prohibit from sending, in the first cell, a cell-specific reference signal (CRS) of the first cell on a time-frequency resource in the second time-frequency resource group.

17. The apparatus according to claim 16, wherein the programming instructions are for execution by the at least one processor to:
   obtain first data, wherein the first data is data to be transmitted in the second cell by using one or more time-frequency resources in the second time-frequency resource group; and
   transmit, in the first cell, the first data by using the one or more time-frequency resources in the second time-frequency resource group.

18. The apparatus according to claim 13, wherein the programming instructions are for execution by the at least one processor to:
   divide the M carriers to determine the N time-frequency resource groups.

19. The apparatus according to claim 18, wherein the programming instructions are for execution by the at least one processor to:
   divide the M carriers according to a physical cell identifier (PCI) to determine the N time-frequency resource groups.

20. The apparatus according to claim 13, wherein the programming instructions are for execution by the at least one processor to:
   send indication information to a terminal device located in the first cell, wherein the indication information is used to indicate the first time-frequency resource group.

* * * * *